Patented June 19, 1923.

1,459,177

UNITED STATES PATENT OFFICE.

CARNIE B. CARTER, OF PITTSBURGH, PENNSYLVANIA, AND ALBERT E. COXE, OF CHICAGO, ILLINOIS, ASSIGNORS, BY MESNE ASSIGNMENTS, TO S. KARPEN & BROS., A CORPORATION OF WEST VIRGINIA.

PROCESS OF PRODUCING NORMAL AND MIXED ETHERS.

No Drawing. Application filed November 26, 1920. Serial No. 426,641.

*To all whom it may concern:*

Be it known that CARNIE B. CARTER and ALBERT E. COXE, citizens of the United States, residing at Pittsburgh, in the county of Allegheny and State of Pennsylvania, and Chicago, Cook County, Illinois, have invented a new and useful Improvement in Processes of Producing Normal and Mixed Ethers, of which the following is a specification.

The present invention relates particularly to the manufacture of normal and mixed ethers by the action of halogenated aliphatic hydrocarbons on alkalies in solution in alcohols of the aliphatic series.

The primary object is to render it possible to produce ethers synthetically from halogenated hydrocarbons of the aliphatic series. Certain of these hydrocarbons can be produced either directly or indirectly from natural gas. Thus, the improved process enables a source of supply to be drawn from in the production of ethers which has not heretofore been available for such purpose.

As an example of the improved process, the following may be given:

Take a quantity of ethyl alcohol, saturate the same with methyl chloride; place the solution in a glass tube, or flask, and add to it a sufficient quantity of an alkali, such as sodium hydroxide, to combine with all of the methyl chloride present in the alcohol, and hermetically seal the vessel and heat in a suitable bath at moderate or elevated temperatures until the reaction is effected. The reaction begins immediately on heating, and if the operation be carried on at a temperature of about 100° C., salt (sodium chloride) immediately appears as a deposit on the bottom of the tube. The reaction is found to be complete at this temperature after a few minutes, say, ten to fifteen minutes. The reaction, however, takes place even at a room temperature of 25° C., but more slowly. If a tube, prepared as described above, be left standing for, say, ten to twelve hours at room temperature, it will be found that salt has been deposited and the reaction has been practically completed.

The reaction noted above probably proceeds in accordance with the following equation:

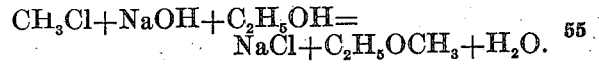
$$CH_3Cl + NaOH + C_2H_5OH = NaCl + C_2H_5OCH_3 + H_2O.$$

The mixed ether resulting from this reaction may be separated from the alcoholic solution by fractional distillation; the ethereal vapors from the distillation may be condensed by a cooling operation.

In carrying out the above reaction under the conditions noted, a pressure is created in the tube, which varies according to the temperature employed. This pressure is useful in the reaction, inasmuch as the methyl chloride, which is largely driven from the solvent by the elevation of temperature, is confined in contact with the solvent and thus maintains the saturation of the solvent with methyl chloride, enabling the reaction to proceed.

It will be readily understood that the character of the ether formed will depend upon the materials employed. Thus, methyl chloride and methyl alcohol would lead to the production of normal methyl ether; methyl chloride with methyl alcohol as a solvent would lead to the production of methyl-ethyl ether; ethyl chloride and methyl alcohol would lead to the production of methyl-ethyl ether; ethyl chloride with ethyl alcohol as a solvent would lead to the production of normal ethyl-ether. The reaction when carried out with combinations of other alkyl halides with other aliphatic alcohols leads to the production of a large variety of normal and mixed ethers.

The temperature at which the reaction may be effected may be any desired temperature. A mixture of the ingredients standing over night in a closed vessel at a temperature of 25° C. practically will complete its reaction. A higher temperature is desirable to expedite the reaction and a temperature of about 100° C. is a suitable temperature to employ.

Inasmuch as the reaction occurs more rapidly as the temperature increases above 25° C. and very rapidly at the boiling point of water, the temperature of 100° C. is preferred. However, in a reaction which proceeds reasonably well at 25° C. and is greatly expedited as the temperature is increased, a temperature as high as 60° C. would be quite practicable, although less desirable than 100° C. Accordingly, a temperature at least substantially as high as 60° C. is, for the purpose of the present process, to be regarded as an elevated temperature within the meaning of the expression as employed in certain of the appended claims. It is unnecessary to employ anhydrous alcohol to obtain large yields of ether. In practice, commercial alcohol which contains about 5% of water may be employed; or a higher percentage of water may be employed but this tends to lower the yield of ether.

It is desirable to employ the alkyl halide and the alkali in substantially equi-molecular proportions. On the other hand, an excess of alcohol will not prevent or seriously retard the reaction, as only the requisite amount of alcohol will enter into the combination. The alkali employed should be a compound of an alkali metal or of an alkaline earth metal, and not a compound of ammonia.

In order to prepare normal ethyl ether by this reaction it is only necessary to employ ethyl chloride in place of methyl chloride, ethyl alcohol being employed, also, as a solvent.

If a carbonate or bicarbonate of an alkali metal be employed in lieu of a hydroxid, the action proceeds more rapidly if a considerable quantity of water be used than would be the case were alcohol of a high degree of concentration used. The water serves to increase the solubility of the carbonates, thereby bringing them into the field of action.

In practice, the reaction will be carried out in an autoclave; and, from time to time, the ether product and alcohol will be removed and subjected to fractional distillation to separate the ether from the alcohol, the salt produced being removed from the still.

An example of halogenated hydrocarbons of the aliphatic series, or alkyl halides, which may be employed are as follows:

Methyl chloride ($CH_3Cl$).
Ethyl chloride ($C_2H_5Cl$).
Methylene chloride ($CH_2Cl_2$).
Isobutyl chloride ($C_4H_9Cl$).

Iodides and bromides of the same character, belonging to the halogenated hydrocarbons of the aliphatic series, may be employed in the process. It will be noted that these materials are mono halogenated compounds, with the exception of the methylene compound.

Examples of alcohols of the aliphatic series, which may be employed in the process, are as follows:

Methyl alcohol ($CH_3OH$).
Ethyl alcohol ($C_2H_5OH$).
Normal propyl alcohol ($C_3H_7OH$).
Isobutyl alcohol ($C_4H_9OH$).

Examples of alkalies which may be employed in the process are as follows:

Sodium hydroxide (NaOH).
Potassium hydroxide (KOH).
Sodium carbonate ($Na_2CO_3$).
Sodium bicarbonate ($NaHCO_3$).
Potassium carbonate ($K_2CO_3$).
Potassium bicarbonate ($KHCO_3$).

Methyl chloride, for example, may be obtained directly from natural gas by a chlorinating process. The same is true of some of the other chlorides.

Alkyl bromides and alkyl iodides may be obtained indirectly from natural gas by first obtaining an alkyl chloride, and then causing, by suitable process, a reaction between the alkyl chloride and a metallic salt of bromine or iodine, as the case may be. Thus, natural gas may be the ultimate source of supply for obtaining the desired halogenated hydrocarbons of the aliphatic series for the purpose of producing ether in accordance with the present process.

The materials undergoing reaction may be present in varying portions, inasmuch as, under the conditions set forth, they will unite in proper proportions to form the ethers. The pressure which arises during the reaction in a closed vessel, whether at ordinary room temperatures, or at elevated temperatures, is sufficient to maintain a sufficient amount of the halogenated hydrocarbon in solution to permit the reaction to proceed. At elevated temperature, the reaction is expedited, the pressure being correspondingly increased. Application of pressure from an external source, is unnecessary, but may be used if desired. The pressure may vary, depending upon materials employed, the product produced and temperature, from a few pounds to perhaps three or four hundred pounds per square inch.

The foregoing detailed description has been given for clearness of understanding only, and no unnecessary limitations should be understood therefrom, but the appended claims should be construed as broadly as permissible in view of the prior art.

What we regard as new, and desire to secure by Letters Patent, is:

1. The process of producing ether, which comprises causing a reaction between a halogenated aliphatic hydrocarbon and an alkali and an alcohol of the aliphatic series, such reaction being effected in a closed vessel under pressure.

2. The process of producing ether, which comprises causing a reaction between an aliphatic hydrocarbon and an alkali and a halogenated alcohol of the aliphatic series, such reaction being effected at elevated temperature, under pressure.

3. The process of producing ether, which comprises effecting a reaction between ethyl chloride, ethyl alcohol and an alkali.

4. The process of producing ether, which comprises effecting a reaction between ethyl chloride, ethyl alcohol and an alkali, under the influence of heat and pressure.

5. The process of producing ether, which comprises causing a reaction between ethyl chloride, ethyl alcohol and sodium hydroxide, under the influence of heat and pressure.

6. The process of producing ether which comprises combining a halogenated aliphatic hydrocarbon with an alkali and an alcohol of the aliphatic series in the presence of water.

7. The process of producing ether, which comprises causing a reaction between a halogenated hydrocarbon and an alkali and an alcohol of the aliphatic series, such reaction being effected at elevated temperature, under pressure, in the presence of water.

CARNIE B. CARTER.
ALBERT E. COXE.